Feb. 19, 1957  N. BREWER  2,781,662
VISCOSITY METER
Filed July 22, 1952
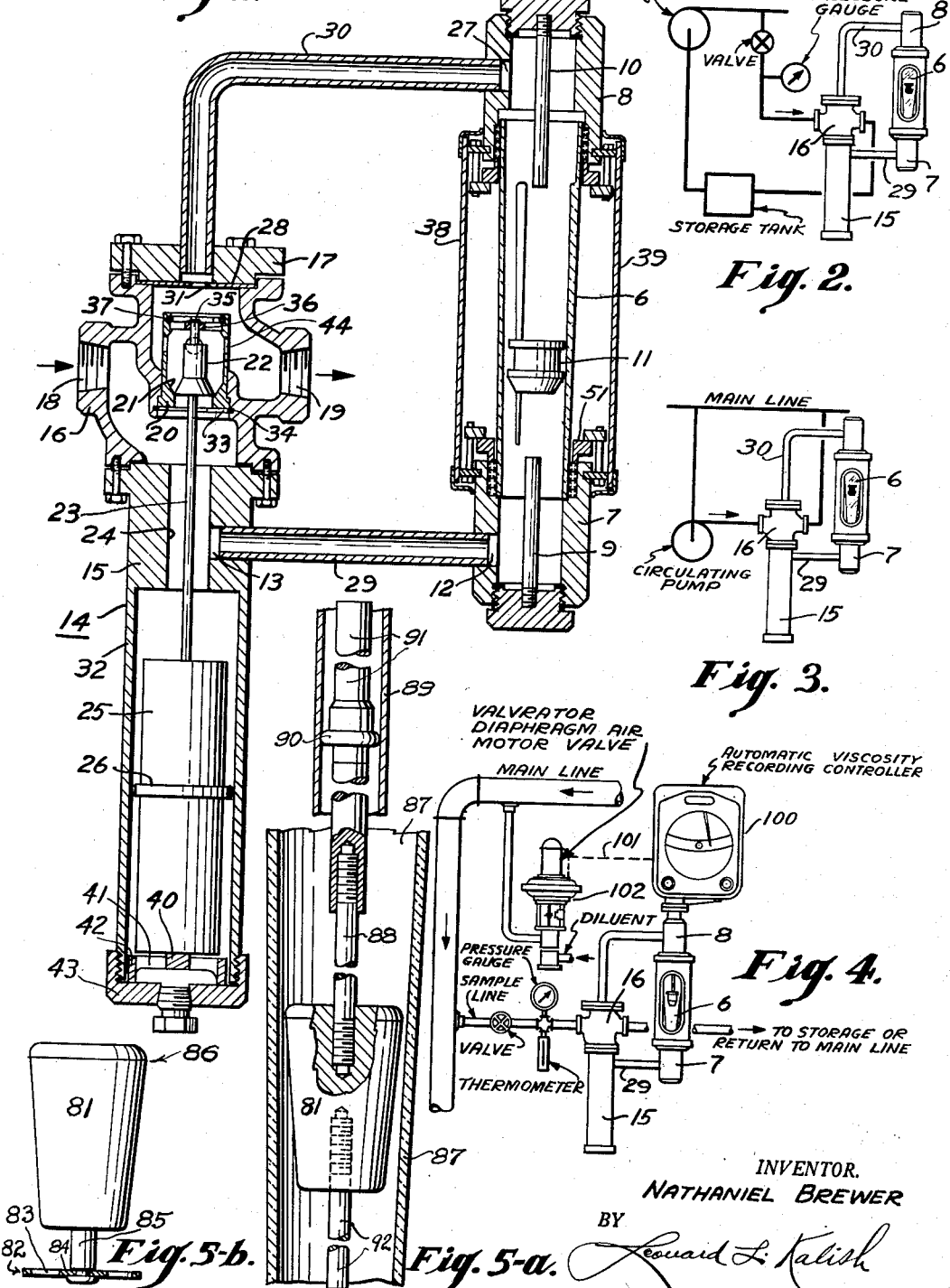
INVENTOR.
NATHANIEL BREWER
BY
Leonard L. Kalish
ATTORNEY.

United States Patent Office

2,781,662
Patented Feb. 19, 1957

2,781,662

VISCOSITY METER

Nathaniel Brewer, Newtown, Pa., assignor to Fischer & Porter Company, Hatboro, Pa., a corporation of Pennsylvania Application July 22, 1952, Serial No. 300,164

8 Claims. (Cl. 73—56)

The present invention relates to certain new and useful viscosity meters for continuously indicating viscosity of a fluid flowing through the meter.

The viscosity meter of the present invention includes a metering chamber of gradually varying internal cross-section and a flow and viscosity sensitive float therein forming therewith an orifice varying in area with the position of the float in the tube, a fixed orifice in series with said metering tube, which fixed orifice is preferably (though not necessarily) insensitive to viscosity, and means for maintaining a constant differential pressure across said orifice and maintaining constant flow through the orifice and through the metering chamber, to eliminate the effect on the flow-rate through the metering chamber of fluctuations in the pressure at the inlet and/or outlet side of the instrument.

One of the objects of the present invention is to provide a more effective and more dependable viscosity meter which may be used for continuously indicating and/or recording the viscosity of fluid flowing through a line; the instrument of the present invention being preferably applied to a small sample stream of the liquid withdrawn from the main line and either returned to the main line further down-stream or discharged to the open atmosphere into a collecting reservoir or discarding stream.

In one aspect or embodiment, the viscosity meter of the present invention includes two tapered chambers in parallel or shunt relation to each other, one a relatively long tapered metering chamber or tube having a relatively small angle of taper and containing a free-floating viscosity-sensitive float, and the other a relatively short press-regulating tapered chamber or tube having a relatively steep angle of taper and containing a relatively heavily weighted float therein forming therewith a variable by-pass or spillway, and a viscosity-insensitive fixed orifice in series with metering tube.

By this parallel or shunt relationship between the two tapered chambers or tubes and the series relationship between the metering tube and the fixed orifice, a single float within the metering chamber will directly indicate the viscosity of the fluid passing through the metering chamber, by the position assumed by the float within said chamber.

In the accompanying drawings wherein like reference characters indicate like parts:

Figure 1 represents a more or less diagrammatic vertical cross-sectional view of one embodiment of the viscosity-meter of the present invention.

Figure 2 is a diagram showing one application of the viscosity-meter of the present invention.

Figure 3 is a diagram showing another application of the viscosity-meter of the present invention.

Figure 4 is a diagram showing still another application of the viscosity-meter of the present invention.

Figure 5a represents a side elevational view of a metering chamber and float therein of a different form from that shown in Figure 1, and which may be used in lieu of the tube 6 and float 11 of Figure 1 (in the apparatus shown in Figure 1).

Figure 5b represents a vertical cross-sectional view of another metering chamber and float therein of a different form from that shown in Figure 1, and which may be used in lieu of the tube 6 and float 11 of Figure 1 (in the apparatus shown in Figure 1).

The viscosity-meter of the present invention includes a generally upright metering tube 6 whose internal cross-sectional area increases from the inlet end to the outlet end thereof, and which may be formed of glass or other transparent or translucent material where a direct-reading instrument is desired, or may be formed of an opaque material, such as metal, where a direct reading is not required but where, instead, auxiliary indicating means are associated with the float contained within the tube, to indicate, at some remote point, the position of the float within the tube.

Whether of glass or metal, transparent, translucent or opaque, the metering tube may be either a plain tapered tube such as shown in U. S. Patents 2,321,041, 2,323,320 and 2,370,634, or it may be a tapered tube with three (or more) parallel bead-guides extending inwardly from the tapered inner bore thereof to guide the float, as shown in U. S. Patent 2,441,350, or it may be a cylindrical tube with flutes extending outwardly from the cylindrical bore thereof, with the horizontal cross-section of the flutes gradually increasing from inlet to outlet end of the tube, as for instance, the fluted tubes of U. S. Patents 2,333,884 (Figures 7–9), 2,350,343 (Figures 12–14), 2,384,800, 2,389,957, 2,403,849, 2,404,361 (Figures 6–16), 2,377,861, 2,388,672 (Figure 1) and 2,417,352.

If made of glass or other non-metallic material and metallic conduits are required, then the metering tube 6 may be supported between suitable end-fittings 7 and 8 in which the metering tube is held in stuffing-glands 5, in fluid-sealed relationship to the fittings. The end-fittings 7 and 8 carry stop members 9 and 10 which provide lower and upper limits of travel for the float 11 within the tube 6. The float 11 is a viscosity-sensitive float, namely, one which is so shaped that variations in viscosity in the fluid will cause it to change its position, vertically, in a stream of fluid having a constant rate of flow through the tube 6, that is, increases in viscosity will cause it to assume a position nearer the outlet end thereof and decreases in viscosity will cause it to assume a position nearer the inlet end thereof.

The inlet 12 of the lower fitting 7 is connected to a constant-flow outlet 13 of a housing designated generally by the numeral 14. The housing 14 includes a lower float-weight housing 15, an upper housing portion 16 and an orifice-retaining flange 17. The housing 16 is provided with an inlet 18 which is connected up-stream to a main line or is connected to the delivery line of a sampling pump, which, in turn, is connected so as to draw from the main line or from any other line, tank or reservoir the viscosity of the contents of which is to be measured and/or recorded, or the viscosity of the contents of which is to be used as the basis for controlling the flow of a reagent, diluent or the like fluid. The housing member 16 is also provided with an outlet 19 which is connected to the down-stream side of the same main line or may discharge to the open atmosphere, into any sample-collecting or discarding reservoir or stream. Within the housing portion 16 a short tapered tube 20 is mounted, with a wide-angle tapered bore 21. The tapered-bore member or sleeve 20, is preferably made separately and of a relatively hard and corrosion and abrasion resistant metal or the like, and is preferably detachably mounted in the housing portion 16 by being screw-threaded in place therein, or held in place by an outwardly expanding split annular retaining spring-ring (of steel or other spring metal or material) which is permitted to expand into the annular groove 34 of a depth less than the cross-section of the wire or body of the split-ring 33, so that a portion of its cross-section will overlap or overlay the end of the sleeve 20, thereby to keep it in place. Within the short wide-angle tapered bore 21 a pressure-regulator float 22 is mounted for vertical motion; the lower edge of the float 22 defining an annular orifice of variable area in conjunction with the tapered bore 21, so that as the float 22 rises, the area of said orifice, between the float 22 and tapered bore 21, increases rapidly but generally linearly to the vertical movement of the float. A rod 23 extends downwardly from the float 22, through a free passageway 24 in the lower housing portion 15, and extends into the float-weight chamber 32, where it carries a float-weight 25 which is of a diameter substantially less than the interior diameter of the float-weight chamber 32, and may be provided with an annular guide-ring or flange 26 which fits the interior diameter of the float-weight chamber 32 with just sufficient clearance to provide an adequate working clearance and fluid-bypass clearance of such amount as will cause the ring or flange 26 to give any desired dash-pot or dampening effect against any tendency of the float 22 to "hunt" when sudden changes in pressure are imposed upon it. The fluid fills the entire chamber 32 both above and below the guide-flange 26, so that the float-weight 25 is at all times fully immersed in the fluid whose viscosity is being measured (although a special immersion liquid may also be used in certain cases in the chamber 32, different from that of the fluid being measured).

The outlet 27 of the upper fitting 8 is connected to the orifice-retaining flange 17, beneath which is an orifice plate or disc 28, having a thin-edged, viscosity-insensitive orifice 31 therein, whose diameter or area is less than the internal cross-sectional area of the conduit or passageway 30 and less than the maximum area provided between the float 11 of the interior of the metering tube 6 when the float is in its position nearest the large end of said tube 6.

The liquid entering the inlet 18 from the up-stream side of the line or from a reservoir or storage tank (with or without the aid of the circulating pump) passes through the passageway 24 into the inlet 12 of the lower or inlet fitting 7 (through the conduit 29) and flows through the metering tube 6 upwardly or in the direction of its increase in internal cross-sectional area, past the viscosity-sensitive float 11 and through the outlet 27 and the conduit 30 and through the orifice 31 in the orifice-plate or disc 28, which is held tightly between the flange 17 and the upper disc-seat of the housing member 16. The effluent from the metering tube 6 then passes out through the down-stream outlet or discharge outlet 19 of the housing member 16.

In addition to the flow path above indicated, a secondary or by-pass flow or spell-flow takes place past the float 22, according to the pressure of the liquid entering the inlet 18 and the back-pressure of the down-stream side of the system. The under-side of the float 22 is subjected to the up-stream pressure or inlet pressure of the liquid entering through the inlet 18, while the top-side of the float 22 is subjected to the down-stream pressure or discharge pressure of the liquid. Hence, the position assumed by the float 22 will be determined by the pressure-differential between the inlet pressure and the outlet pressure. The float-weight 25 shortens the vertical movement of the float 22 responsive to such pressure-differential acting upon it, which pressure-differential acts upon it in an upward direction because the up-stream or inlet pressure is always greater than the down-stream or outlet pressure. As the float 22 rises however, the orifice formed between the float 22 and the tapered-bore 21 increases so as to provide a greater by-pass for the liquid as the pressure-differential between up-stream and down-stream increases, thereby creating a constant differential-pressure across the orifice 31. This, in turn, results in a constant rate of flow through the metering tube 6, past the viscosity-sensitive float 11, notwithstanding wide fluctuations of pressure of the liquid entering the inlet 18.

By reason of this constant rate of flow, the changes in vertical position of the viscosity-sensitive float 11 will indicate changes in viscosity; any particular position assumed by the float 11 representing a particular viscosity. By suitable calibrations applied to the tube or to a scale alongside of it, direct or relative reading of viscosity may be obtained at all times.

The viscosity-sensitive float 11 may also be used as the guiding element of a remote indicating instrument of any suitable character, such as that of U. S. Patents 2,481,196, 2,472,090, 2,380,399, 2,425,691 and 2,557,072, or of a recording instrument such as that of U. S. Patent 2,414,086 whereby the changes in viscosity will be indicated at some remote point or may be recorded on a paper disc or belt moving at a constant rate and suitably calibrated, to show viscosity of the flowing liquid throughout a given period of time and the float 11 of the present viscosity-meter may also be used to activate or sensitize a flow-control mechanism such as that shown in U. S. Patent 2,481,496, whereby the flow in a diluent feed-line or the like may be regulated automatically to maintain any predetermined viscosity.

The orifice 31 in the orifice plate or disc 28 is what is generally called a fixed orifice. However, it may be a gate-valve type fixed orifice or other fixed orifice adjustable in size for purposes of changing the range or adjustment of the instrument. Though the orifice may be of such an adjustable form or construction, it may yet be fairly considered as a "fixed" orifice, in the sense that it does not change its own effective size automatically by or as a result of the changes in the rate of flow through or pressure-differential across the orifice. This is a contradistinction of the variable-area type orifice formed by the float 11 and tube 6, whose effective size automatically changes as the position of the float changes. Hence, in referring to a "fixed" orifice it should be understood that such fixed orifices may either be a non-adjustable fixed orifice or an adjustable fixed orifice. In either case, however, the orifice is preferably though not necessarily a viscosity-insensitive type, namely, presenting a thin edge to the liquid flowing through it; and preferably without any taper leading to the thin edge, on the up-stream of the orifice plate. It is not altogether necessary to have a viscosity-insensitive type orifice because the flow-rate through the orifice is maintained constant and in a high Reynold number range, in which the effects of viscosity on the orifice are minimized.

A short guide-rod or extension 35 may be affixed to and extended upwardly from the float 22, and guided in the corresponding aperture in the hub portion of the spider 36 which may be held in place by a split-ring 37 in an internal groove, similar to the ring 33 and groove 34 hereinabove described.

A bottom stop member 40, carried by a spider or spokes 41, within a ring 42, may be provided at the bottom of the float-weight chamber 32; held in place by the screw-cap 43, to fix the bottommost position of the float 22. This position is such that a zero or substantially zero by-pass is provided between the lower edge of the float 22 and the tapered inner bore 21 of the sleeve 20, when the weight 25 rests on the stop 40.

The fittings 7 and 8 may be held together by the outer metallic housing members or sections 38 and 39 of the construction shown in Patent 2,370,634. Thus, construction for holding the fittings 7 and 8 in assembled relation to each other and for adjusting and tightening the stuffing glands may be such as illustrated in Figures 1, 2, 3, 4 and 5; or as illustrated in Figures 6 and 7 of Patent 2,370,634, to which reference may be had for the details in this fitting-and-housing construction to support the metering tube 6.

The sleeve 20 may have a plurality of holes 44 through its side-wall, above the tapered bore 21 thereof, for spilling out the by-pass fluid more directly into the area of the discharge port 19.

The viscosity-sensitive float in the metering tube 6 may be either of the shape shown in Figure 1 or of the shape shown in Figures 5a and 5b hereof; the latter being preferred. Earlier float-shapes substantially sensitive to viscosity changes are shown in Patent 2,321,041; the float 62 shown in Patent 2,426,263; the float 14 shown in Patent 2,348,732; the float 24 shown in Patent 2,311,181, and the floats 176 or 151 in Patent 2,426,393.

Thus, instead of the float 11 shown in Figure 1, I prefer to use a truncated conical float 81 like that shown in Figures 5a and 5b with a relatively long continuous tapered surface and with the lower and upper edges rounded off, to induce as close to a stream-line flow past the float as may be practicable and thus to produce a high response or sensitivity to viscosity. For a direct-reading viscosity meter according to the present invention using a bead-guide tube such as the tube 6 indicated in Figure 1, I may provide a guide-ring 82 beneath the lower small end of the float 81, of the same diameter as the maximum upper diameter of the float at 86; said ring 82 being held by three or four thin spokes 83 extending outwardly from a central apertured hub 84 which is riveted or otherwise fastened to the end of a downwardly extending rod 85 affixed to the lower end of the float 81. By this means, the float 81, when disposed within the bead-guide tube 6 in Figure 1, will be prevented from wobbling because it will be guided by the three vertical parallel beads of the tube 6, both at the large upper diameter of the float indicated by the arrow 86 as well as by the correspondingly diametered guide-ring 82.

In using the float 81 in the bead-guide tube 6 in Figure 1, the lower stop-member 9 would be shortened, to an extent such that when the lower riveted end of the rod 85 beneath the float 81 comes to rest on top of the stop-member 9, the upper maximum-diameter 86 of the float 81 will be more or less at the zero position of the taper of the tube 6, namely, at the position where the diameter of the tapered portion of the tube 6 will be but slightly greater than the diameter of the float at 86.

If a plain tapered tube (namely without any bead-guides) is used, as for instance the plain tapered tube 87 shown fragmentarily in Figure 5a, a dynamically stable viscosity-sensitive float as for instance the float 62 shown in Patent 2,426,263 or the float 24 shown in Patent 2,311,181 may be used, having substantial viscosity-sensitivity or viscosity-response.

Where a magnetic or an electro-magnetic pick-up is to be used for picking up and indicating the position of the float 81, a (solid or hollow) extension rod 88 is extended from one end of the float 81, co-axially therewith, into a non-magnetic metallic guide-tube 89 which is in liquid communication with the metering tube 87. The rod 88 carries a guide-ring or annular projection 90, which fits into the parallel-walled tube 89 with appropriate working clearance for guidance thereof, and above the guide-element 90 a further extension 91 carries one or two permanent magnets imbedded therein, which may act upon one or a pair of permanent magnets movably mounted adjacent the tube 89 in the zone of the magnets within the member 91 so as to be carried thereby, thus transmitting the position of the float 81 to an exterior mechanical or electrical system; or a permanent magnet or iron-core contained within the non-ferrous extension 91 may be used to vary the inductance of an electrical circuit, one or several of whose coils surround the tube 89, thereby to indicate, at any suitable remote point, the position of the float 81 or to operate a controller or recorder, in servo-motor fashion, in the manner known in the art and shown in part by the patents above referred to.

A lower guide-rod 92 may be extended from the float 81, in the direction opposite to that of the rod 88, and a corresponding guide-tube, similar to the guide-tube 89 is provided at the other end of the metering-tube 87 and in communication therewith, into which the guide-rod 92 may be extended, for guiding float co-axially in relation to the beadless tapered tube 87; all in the manner known in the art and shown in part by the patents and publications above cited.

In Figures 2, 3 and 4 I have shown several applications of the viscosity-meter of the present invention. Figure 2 shows the application of the viscosity-meter to a storage tank; the liquid whose viscosity is to be measured being admitted into the meter by the valve shown, and the circulating pump serving to move the liquid through the meter and storage tank.

In the application shown in Figure 3 the liquid is withdrawn from and returned to the main line, with the aid of the circulating pump.

In the application shown in Figure 4 an automatic recording and controller instrument 100, such as that shown, for example, in Catalog No. 50 published by the Fischer & Porter Company (of Hatboro, Pa.) entitled "Exhibiting and Controlling Instruments for Use With Flowrator Meters" is applied to the instrument of Figure 1, in the manner indicated in Figure 4; the float 11 being provided with an upper extension which enters the pick-up portion of such automatic recording controller.

For the magnetic pick-up of the float position see the illustration 5 on page 5003 of the aforesaid catalog. For the electrical transmission for remote indicating viscosity, see illustrations 9 and 13 on pages 5006 and 5007, respectively, of the aforesaid catalog. For the controller see illustrations 31 and 39 on pages 5015 and 5019, respectively, of the aforesaid catalog. For the recording instrument see the cover page of the aforesaid catalog.

In the application shown in Figure 4 the controller may be connected through the connection 101 with a diaphragm air-motor valve 102, which may be of the kind and construction shown in Catalog 70–B published by the Fischer & Porter Company (of Hatboro, Pa.) entitled "Valvrator Diaphragm Air Motor Valve" (see ilustrations B and C on page 7003 of said catalog). By this means the flow of any reagent diluent or other fluid may be regulated by the fluid being measured. Thus, for instance, as the viscosity in the main line increases, the amount of diluent added may be correspondingly increased and thus the viscosity of the discharge from the main line kept constant. Any other fluid additive may be controlled by the viscosity of the liquid being measured.

The valve-actuator means for the application shown in Figure 4, may also be of the type shown in Patent 2,472,090.

Indicator means such as shown in Patent 2,425,691 may also be used with float 11.

Having described my invention what I claim as new and desire to protect by Letters Patent is the following:

1. A viscosity meter including an upright metering tube whose horizontal internal cross-sectional area increases from a threshold point near the inlet end thereof to a limiting point near the outlet end thereof, a viscosity-sensitive metering float in said metering tube forming therewith a passage of variable effective area for the passage of fluid past said metering float, the area of said passage increasing as the float assumes a position nearer the outlet end thereof and decreasing as the float assumes a position nearer the inlet end thereof, a differential pressure regulator shunted across the inlet and outlet of said metering tube, and means forming a flow-restricting orifice between said metering tube and said regulator and disposed in series with said metering tube, the relationship between such orifice-means and said metering tube and said metering float being such that the pressure-drop across said orifice-means is substantially greater than the pressure-drop across said metering-float, said regulator providing a relatively constant pressure-drop across said orifice-means and across said metering tube and providing a relatively constant rate-of-flow through said metering tube.

2. A viscosity meter including an upright tapered metering tube having its smaller end down and its larger end up, a viscosity-sensitive float operatively disposed within said tube forming therewith a passage of variable effective area for the passage of fluid past said float, an up-stream inlet connected to the lower small end of said metering tube and a down-stream outlet connected to the larger upper end of said metering tube, a constant differential pressure regulator shunted across said up-stream inlet and said down-stream outlet and arranged to form a liquid passageway between said inlet and said outlet by-passing said metering tube, and means forming a flow-constricting orifice between said metering tube and said regulator and in series with said metering tube, said constant differential pressure regulator having its inlet side subjected to the up-stream pressure and its outlet side subjected to the down-stream pressure, the relationship between said orifice-means and said metering tube and the float therein being such that the pressure-drop across said orifice-means is substantially greater than the pressure-drop across said float, said constant differential-pressure regulator providing a relatively constant pressure-drop across said orifice-means and across said metering tube and providing a relatively constant rate-of-flow through said metering tube.

3. A viscosity meter including an upright tapered metering tube with its smaller end down and its larger end up, a viscosity-sensitive float in said tube, said tube connected in series with an up-stream inlet connected to the small end of the tapered tube, and with a down-stream outlet connected to the large end of the tapered tube, a differential pressure regulator, having a by-pass passageway for liquids, shunted across said up-stream inlet and the down-stream outlet of said metering tube and means forming a flow-constricting orifice between said metering tube and said by-pass passageway and in series with said metering tube, the relationship between said orifice-means and said metering tube and the float therein being such that the pressure-drop across said orifice-means is substantially greater than the pressure-drop across said float, said differential-pressure regulator providing a relatively constant pressure-drop across the said orifice-means and across said metering tube and providing a relatively constant rate-of-flow through said metering tube.

4. A viscosity meter including an upright metering tube, a viscosity-sensitive metering float therein, said metering tube and said metering float together forming a passageway of variable effective cross-sectional area for the passage of fluid through said metering tube past said metering float, the effective cross-sectional area of such passageway varying with the position assumed by said float within said metering tube along the length of said tube, and said effective cross-sectional area increasing as the float assumes a position nearer the outlet end of said tube and decreasing as the float assumes a position nearer the inlet end of said tube, a differential pressure regulator, having a by-pass passageway of variable effective cross-sectional area shunted across thte inlet and outlet of said metering tube exteriorly thereof, said variable by-pass passageway being formed of a stationary regulator opening and a movable regulator float disposed in operative juxtaposition thereto and so related to each other that as the movable regulator float moves in relation to said stationary regulator opening, the effective cross-sectional area of the by-pass passageway formed therebetween varies in effective cross-sectional area and increases as said movable regulator float moves in the direction of the outlet side of said regulator opening and decreases as said movable regulator float moves in the direction of the inlet side of said regulator opening, a weight connected with said movable regulator float, and means forming a flow-constricting orifice between said metering tube and said regulator and in series with said metering tube, the relationship between such orifice-means and said metering tube and the metering float therein being such that the pressure-drop across said orifice-means is substantially greater than the pressure-drop across said metering float in the metering tube, said differential-pressure regulator providing a relatively constant pressure-drop across said orifice-means and across said metering tube and providing a relatively constant rate-of-flow through said metering tube.

5. A viscosity meter including an upright metering tube whose horizontal internal cross-sectional area increases from a threshold point near the inlet end thereof to a limiting point near the outlet end thereof, a viscosity-sensitive metering float in said metering tube forming therewith a passage of variable effective area for the passage of fluid past said metering float, the area of said passage increasing as the metering float assumes a position nearer the outlet end thereof and decreasing as the metering float assumes a position nearer the inlet end thereof, mechanical means for guiding said metering float axially of said metering tube with minimum contact therewith, a differential-pressure regulator shunted across the inlet and outlet of said metering tube, with the inlet side of said regulator connected with the inlet of said tube and with the outlet side of said regulator connected with the outlet of said tube, and means forming a flow-constricting orifice between said metering tube and said regulator and in series with said metering tube, the relationship between such orifice-means and said metering tube and the float therein being such that the pressure-drop across said orifice-means is substantially greater than the pressure-drop across the metering float, said differential-pressure regulator providing a relatively constant pressure-drop across said orifice-means and across said metering tube and providing a relatively constant rate-of-flow through said metering tube.

6. A viscosity meter including an upright metering tube whose horizontal internal cross-sectional area increases from a threshold point near the inlet end thereof to a limiting point near the outlet end thereof, a viscosity-sensitive metering float in said metering tube forming therewith a passage of variable effective area for the passage of fluid past said metering float, the area of said passage increasing as the metering float assumes a position nearer the outlet end thereof and decreasing as the metering float assumes a position nearer the inlet end thereof, mechanical means for guiding said metering float axially of said metering tube with minimum contact therewith, a differential-pressure regulator having an inlet and an outlet, shunted across said metering tube, said regulator including a relatively short tapered regulator tube with a relatively steep taper intermediate said inlet and said outlet, with its small end down and towards said inlet and its large end up and towards said outlet, and with its axis substantially vertical, a regulator float within said tapered regulator tube forming a by-pass passageway with said tapered regulator tube whose effective area varies according to the position of the regulator float, a weight-receiving chamber, and a relatively heavy weight connected with said regulator float and disposed within said chamber, said chamber being in communication with the interior of said regulator, and means forming a flow-constricting orifice between said metering tube and said regulator and in series with said metering tube, the relationship between such orifice-means and said metering tube and its metering float being such that the pressure-drop across said orifice-means is substantially greater than the pressure-drop across the metering float, said differential-pressure regulator providing a relatively constant pressure-drop across said orifice-means and across said metering tube and providing a relatively constant rate-of-flow through said metering tube.

7. A viscosity meter including an upright metering tube whose horizontal internal cross-sectional area increases from a threshold point near the inlet end thereof to a limiting point near the outlet end thereof, a viscosity-sensitive metering float in said metering tube forming therewith a passage of variable effective area for the passage of fluid past said metering float, the area of said passage increasing as the metering float assumes a position nearer the outlet end thereof and decreasing as the metering float assumes a position nearer the inlet end thereof, mechanical means for guiding said metering float axially of said metering tube with minimum contact therewith, a differential-pressure regulator having an inlet and an outlet, shunted across said metering tube, said regulator including a relatively short tapered regulator tube with a relatively steep taper intermediate said inlet and said outlet, with its small end down and towards said inlet and its large end up and toward said outlet, and with its axis substantially vertical, a regulator float within said tapered regulator tube forming a passage with said tapered regulator tube whose effective area varies according to the position of the regulator float, a weight-receiving chamber, and a relatively heavy weight connected with said regulator float and disposed within said chamber, said chamber being in communication with the interior of said regulator but outside of the path of the stream flowing through said regulator, and means forming a flow-constricting orifice between said metering tube and said regulator and in series with said metering tube, the relationship between such orifice-means and said metering tube and its metering float being such that the pressure-drop across said orifice-means is substantially greater than the pressure-drop across said metering float, said differential-pressure regulator providing a relatively constant pressure-drop across said orifice-means and across said metering tube and providing a relatively constant rate-of-flow through said metering tube.

8. A viscosity meter including an upright metering tube whose horizontal internal cross-sectional area increases from a threshold point near the inlet end thereof to a limiting point near the outlet end thereof, a viscosity-sensitive metering float in said metering tube forming therewith a passage of variable effective area for the passage of fluid past said metering float, the area of said passage increasing as the metering float assumes a position nearer the outlet end thereof and decreasing as the metering float assumes a position nearer the inlet end thereof, mechanical means for guiding said metering float axially of said metering tube with minimum contact therewith, a differential-pressure regulator shunted across the inlet and outlet of said metering tube, said regulator having an inlet and an outlet, a relatively short tapered regulator tube with a relatively steep taper intermediate said inlet and said outlet, with its small end down towards the inlet and with its large end up and towards the outlet and with its axis substantially vertical, a regulator float within said tapered regulator tube forming a passage with said tapered regulator tube whose effective area varies according to the position of the regulator float, float-guiding means for said regulator float having a relatively small guiding-contact surface, a loading chamber in communication with the interior of said regulator, means within said chamber for heavily loading the regulator float in the direction of minimum passage between it and the tapered regulator tube, said float-loading means, said regulator float and said float-guiding means therefor being arranged to suspend the regulator float in the moving stream of fluid under operating conditions, with minimum guiding friction, with the inlet side of said regulator connected with the inlet of said metering tube and with the outlet side of said regulator connected with the outlet of said metering tube, and means forming a flow-constricting orifice between said metering tube and said regulator and in series with said metering tube, the relationship between such orifice-means and said metering tube and metering float being such that the pressure-drop across said orifice-means is substantially greater than the pressure-drop across the metering float, said differential-pressure regulator providing a relatively constant pressure-drop across said orifice-means and across said metering tube and providing a relatively constant rate-of-flow through said metering tube.

References Cited in the file of this patent

UNITED STATES PATENTS

| | | |
|---|---|---|
| 2,038,432 | Konheim et al. | Apr. 21, 1936 |
| 2,208,444 | Bailey | July 16, 1940 |
| 2,426,393 | Fischer | Aug. 26, 1947 |
| 2,486,599 | Williams | Nov. 1, 1949 |

FOREIGN PATENTS

| | | |
|---|---|---|
| 851,326 | France | Oct. 2, 1939 |